Aug. 12, 1969 R. N. STECKENRIDER 3,461,454

POSITION IDENTIFYING DEVICE

Filed June 6, 1968 3 Sheets-Sheet 1

INVENTOR
RAY N. STECKENRIDER

BY John B Froone

ATTORNEY

United States Patent Office 3,461,454
Patented Aug. 12, 1969

3,461,454
POSITION IDENTIFYING DEVICE

Ray N. Steckenrider, Raleigh, N.C., assignor to International Business Machines Corporation, Armonk, N.Y., a corporation of New York Filed June 6, 1968, Ser. No. 735,018
Int. Cl. G01s 3/02
U.S. Cl. 343—112 7 Claims

ABSTRACT OF THE DISCLOSURE

Orthogonally arranged horizontal and vertical conductors in substantially the same plane are subjected to a narrow RF field emanating from a probe positioned between any intersecting pairs of horizontal and vertical conductors. Horizontal and vertical differential sense amplifiers each connected to adjacent horizontal and vertical conductors, respectively, respond to the currents induced by the RF field and that horizontal and vertical differential sense amplifier connected to the adjacent conductors bracketing the probe provide a detectable output identifying the probe position.

BACKGROUND OF THE INVENTION

Field of the invention

The invention relates to position identifying devices for use with displays for identifying locations on the display and more particularly to position identifying devices which radiate a narrow RF field in proximity to the area on the display to be identified and which is detected by selected sense amplifiers to thereby identify the position of the RF field and thus the area on the display.

DESCRIPTION OF THE PRIOR ART

Electronically generated cathode ray tube and optical projection images have been finding increased usage as input devices for data processing systems. These are particularly useful since they increase man/machine communications ability. The graphic nature of the input device reduces substantially the training requirements for the operator since the graphic display may contain instructional material.

The operator in systems of this type is presented a graphic image under control of the data processor and a response is generated when he identifies one or more specific areas on the image.

In the case of cathode ray tube displays, a light sensitive device is enabled at the operater selected response point when the beam paints the image at that point. The deflection circuits at detection contain positional data defining the beam location. This information is sent to the data processor which can tell what the response was since it is aware of the image content and the position of the light sensitive device. The above technique has been used extensively since it is effective in most instances and is troublesome only in those instances where a dark screen area requires identification.

With a projected image, however, positional information is not available. Prior art techniques for identifying response locations involves generating nonvisible (i.e., red) light scanning columns and detecting these with sensors. These systems require the generation of clock signals and counters for providing positional information. Thus, the counters are gated when the sensor detects the scanning columns and the counter value indicates the one or the other coordinate values of the sensor.

Systems employing invisible scanning light columns and sensors are entirely satisfactory in operation, however, they are costly to manufacture and require precise alignment once disturbed or otherwise subjected to mechanical shock or vibration.

SUMMARY OF THE INVENTION

The invention contemplates a device for providing position information relative to an electromagnetic radiating probe located in close proximity to a plane surface and comprises a plurality of spaced, substantially parallel horizontal and vertical wires located in close proximity to the said plane, a first group of differential sense amplifiers responsive to adjacent horizontal wires for providing an output when the currents induced in the connected adjacent horizontal wires by the radiating probe are out of phase with each other to thereby provide positional information in the vertical direction, and a second group of differential sense amplifiers responsive to adjacent vertical wires for providing an output when the currents induced in connected adjacent vertical wires by the radiating probe are out of phase with each other to thereby provide positional information in the horizontal direction.

One object of this invention is to provide an electromagnetic detection system for deriving position data defining the physical position of a probe which radiates the electromagnetic energy detected by the system.

Another object of the invention is to provide a position detecting system which is capable of operating under all ambient lighting conditions.

A further object of the invention is to provide a position detecting system as set forth above which is suitable for use with different types of display devices.

Yet another object is to provide a position detection system as set forth above which is inexpensive to manufacture, reliable in operation and insensitive to mechanical shock or vibration.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
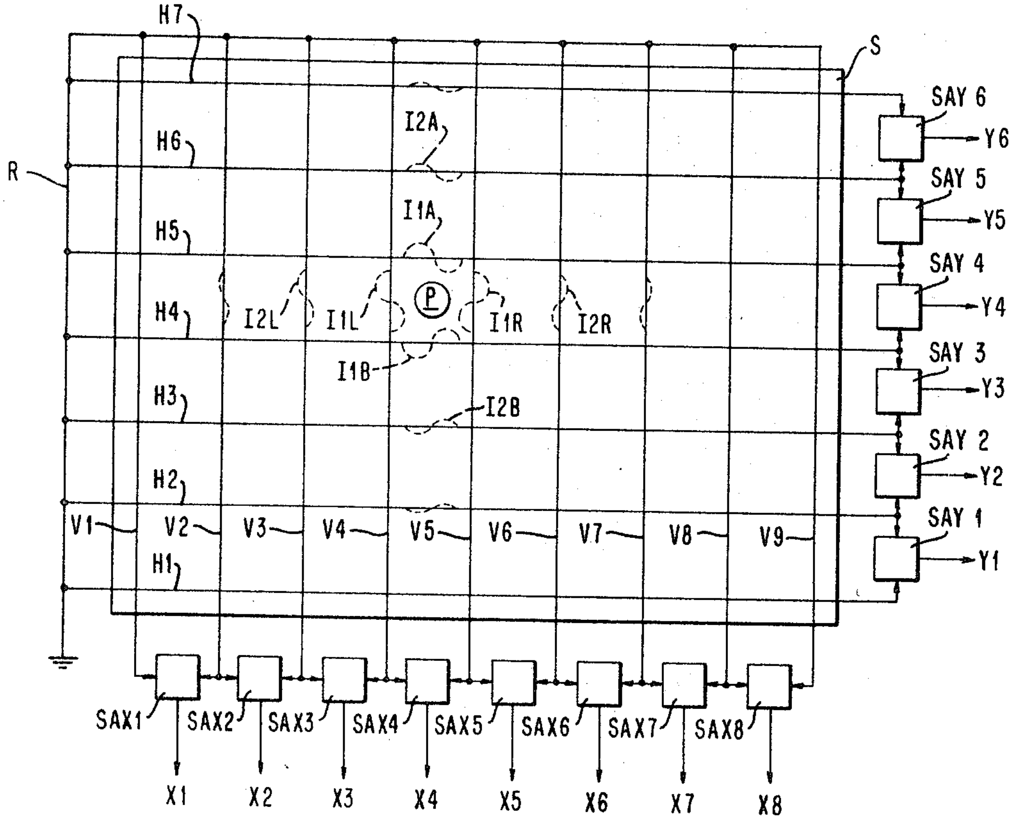
FIGURE 1 is a block diagram of a novel position detection and signalling system constructed is accordance with the invention.

In FIGURE 1, element S represents schematically a ground glass viewing screen, the face of a cathode ray tube or any other screen or device for displaying graphic information. A plurality of spaced substantially parallel vertical conductors V1–V9 are supported within or in close proximity to the screen S. A second group of similarly arranged horizontal conductors H1–H2 are also supported in or in close proximity to screen S. The intersections of conductors V and H are insulated from each other to provide physical isolation between conductors H and V at the intersections. A conductor R connected to ground reference potential is connected to one end of the conductors V and H.

Conductors V1 and V2 are connected to the inputs of a differential sense amplifier SAX1 which provides an output when properly energized on output conductor X1. Conductors V2 and V3 are connected to the inputs of a differential sense amplifier SAX2 which provides an output on conductor X2 when properly energized. The operation of the differential sense amplifiers will be described later in connection with the description of FIGURE 2. The remaining vertical conductors V3–V9 are connected in a similar manner to differential sense amplifiers SAX3–SAX8.

Each vertical conductor with the exception of the first and last conductor is connected to two differential sense amplifiers, thus each differential sense amplifier is responsive to two adjacent conductors.

Horizontal conductors H1–H7 are connected to differential sense amplifier SAY1–SAY6 in the same manner as the vertical. Amplifiers SAY1–SAL6 provide outputs Y1–Y6, respectively. With this arrangement, forty-eight response points may be detected and identified by combinations of one of the eight X outputs X1–X8 and one of the six Y outputs Y1–Y6. If more response points are required, they may be obtained by increasing the number of horizontal and/or vertical conductors, as required by the aspect ratio of the screen S, and the number of amplifiers with the same arrangement shown in FIGURE 1.

Figure 3:
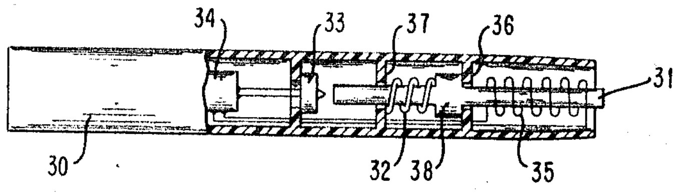
FIGURE 3 is a schematic electromechanical drawing illustrating the construction of a radiating probe.

When a point on an image displayed on screen S is to be identified, a probe P, shown schematically in FIGURE 1 and in detail in FIGURE 3, is brought into contact with the screen S at the desired point. As soon as contact with the screen is made, the probe P radiates radio frequency electromagnetic waves. These waves induce currents I1A and I2A in conductors H5 and H6, respectively. The induced currents are in phase with each other and tend to cancel such that the differential sense amplifier SAY5 connected to conductors H5 and H6 provides no output. Probe P induces currents I1B and I2B in conductors H4 and H3. These currents are in phase with each other but of opposite phase to currents I1A and I2A. Differential sense amplifier SAY3 connected to conductors H4 and H3 provides no output since the currents induced in conductors H4 and H3 are in phase with each other. However differential sense amplifier SAY4 provides an output since the currents induced in conductors H4 and H5 are of opposite phase. The output provided at Y4 indicates the vertical position of the probe P along the Y axis.

In a like manner, the currents induced in the vertical conductors detect, in cooperation with differential sense amplifiers SAX1–SAX8, and identify the horizontal position of probe P along the X axis. In the illustrated case, currents I1L and I2L induced in vertical conductors V4 and V3, respectively, are in phase with each other and differential sense amplifier SAX3 provides no output. Currents I1R and I2R induced in vertical conductors V5 and V6 are in phase with each other but of opposite phase with respect to currents I1L and I2L. Therefore differential sense amplifier SAX5 provides no output while amplifier SAX4 provides an output on X4 to indicate the horizontal position of probe P along the X axis. The current induced in more remote conductors have not been described since they are of lesser magnitude and in phase therefore none of the other differential sense amplifiers in FIGURE 1 will provide an output and the sole outputs generated for the illustrated position of probe P are X4 and Y4 which correspond directly to rectangular coordinates of the probe.

The above described position detection and identification system is relatively immune to induced noise currents since the induced noise currents in adjacent conductors produce in phase signals to the connected differential sense amplifiers and thus minimize their outputs. Stray inductive and/or capacitive fields have little or no effect on the system since the currents induced are predominately in-phase and therefore provide little or no input signal to the differential sense amplifiers. Since the most desirable output from the sense amplifiers is in most case a DC level, the output can be heavily integrated for further noise rejection.

Probe P shown in greater detail in FIGURE 3 includes a body portion 30, a moveable switch actuator 31 which is biased to an inoperative position by a spring 32. When the actuator 31 is brought into physical contact with the screen S, it moves against spring 32 and closes the contacts of a switch 33 completing a circuit for energizing a radio frequency oscillator 34 to a connected coil 35 which provides the alternating field that induces the currents previously described. A radial flange 36 extending from body 30 retains switch actuator 31 within the body 30 and another radial flange 37 extending from body 30 anchors spring 32 which urges switch actuator 31 into the inoperative position. A circumfrential enlargement 38 on switch actuator 31 engages flange 36 which retains the actuator 31 in body 30.

Figure 2:
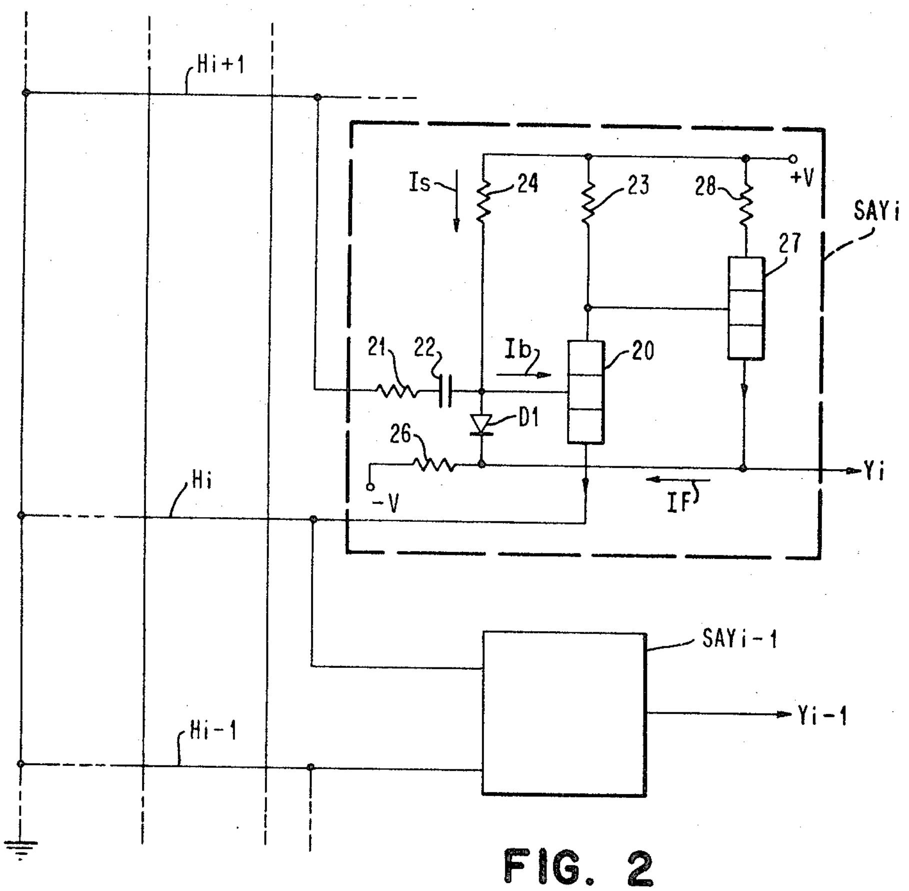
FIGURE 2 is a schematic diagram of a differential sense amplifier shown in block form in FIGURE 1 and the circuit connections thereto.

A single differential sense amplifier SAY*i* is shown in detail in FIGURE 2. The other sense amplifiers are identical in all respects. Horizontal conductor *Hi*+1 is connected to the base of a transistor 20 by a series connected resistor 21 and a coupling capacitor 22. The collector of transistor 20 is connected to positive voltage source +V by a resistor 23 and the emitter of transistor 20 is connected directly to horizontal conductor H*i*. A resistor 24, a diode D1 and a resistor 26 connected in series between source +V and another voltage source −V provide a current source for base current to transistor 20 which has its base connected to the common junction of resistor 24 and diode D1.

The collector of transistor 20 is connected directly to the base of another transistor 27 which has its collector connected to source +V by a resistor 28 and its emitter connected directly to the common junction of diode D1 and resistor 26.

Under quiescent conditions, i.e. conductors *Hi*+1 and H*i* both at ground potential base current I*b* for transistor 20 is supplied by the current source I*s* which is much greater than I*b* and transistor 20 is in conduction. The collector potential of transistor 20 maintains transistor 27 in conduction and IF flows to the junction of diode D1 and resistor 26.

If voltages are induced in conductors *Hi*+1 and H*i* such that *Hi*+1 is negative with respect to H*i*, current is drawn through capacitor 22 and resistor 21 tending to reduce the base current 1*b*. This causes the collector voltage to rise driving transistor 27 into further conduction and IF increases and restores the base current I*b* until stability is reached. However, if the potential is sufficiently large so as to reduce the value of I*s* through diode D1 below IF the diode D1 becomes reversed biased and I*b* falls toward zero cutting off transistor 20. At this time, transistor 27 conducts more heavily and the emitter voltage rises toward +V from the quiescent value of approximately ground to indicate the input condition to the base of transistor 20 set forth above.

During positive swings of the induced voltages, i.e. when *Hi*+1 is positive with respect to H*i* the quiescent condition is restored, thus a series of positive pulses at the frequency of the radiating probe are observed at the output Y*i*. These may be amplified and filtered if a direct current logic level signal is desired.

Figures 4A, 4B:
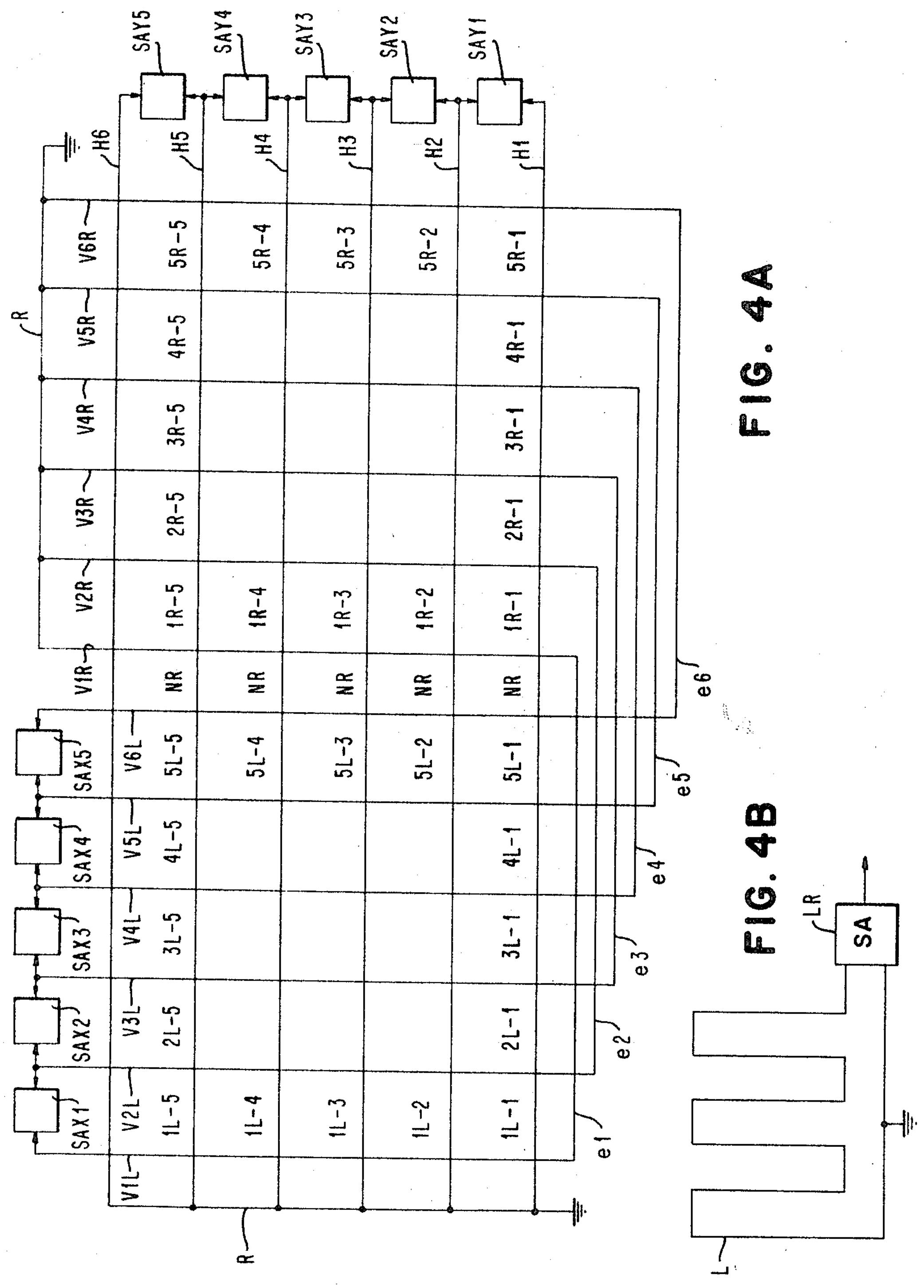
FIGURES 4A and 4B are block diagrams illustrating an alternative wiring arrangement for FIGURE 1.

FIGURES 4A and 4B illustrated an alternative wiring arrangement which permits a reduction in the number of differential sense amplifiers required. According to this arrangement, the grid is divided into two areas by a no response area labeled NR. The width of this area may be adjusted from near zero to any desired value by altering the spacing between vertical conductors V6L and V1R. The corresponding vertical conductors, e.g. V1L and V1R are externally connected by conductor *e*1. The remaining conductors are similarly connected.

Sense amplifiers SAX1–SAX5 will respond for two columns and a left/right signal is required in order to establish which of the two vertical columns provides the response. This is accomplished by providing an insulated superimposed conductive loop as shown in FIGURE 4B over the left side vertical conductors. When the probe P is located on the left side, currents induced in loop L are detected by a sense amplifier LR which indicates that the probe is located on the left side of the grid and the (1L–5L) coordinates are to be used for defining the probe location. When the probe is on the right side of NR, sense amplifier LR provides no output and the (1R–5R) coordinates are used for defining the probe location.

This technique may be expanded to the horizontal conductors and the grid will be divided into quadrants rather than halves as described above. In this instance another loop such as L will be required on either the upper or lower half of the grid and an additional sense amplifier. The LR sense amplifier and the additional one set forth above are capable of identifying the probe quadrant. This arrangement results in a fifty percent reduction in the number of differential sense amplifiers.

These arrangements are particularly suitable in those instances where fixed format data is to be displayed and identified and the projected image covers only part of the grid since the multiple conductors need not be used in the projection area and thus would not interfere with the projected image. For example, the left side of the grid in FIGURE 4A could be used to display fixed format data in the form of an opaque overlay while a projected image could be displayed on the screen contiguous with the right half of the grid thus the superimposed conductors on the left side of the grid would not impair the projected image quality in any way.

This technique would not ordinarily be used where a homogeneous image were to be displayed on a screen contiguous with the entire grid since the light absorbing qualities of the different portions of the screen would differ and could be annoying. However, if the image is arbitrarily divided along NR and a different dipslay format is used in either half, this wiring technique may be used to advantage even where the projected image is contiguous with the entire grid.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for detecting the position of a probe radiating an electromagnetic field in close proximity to a surface comprising:

a first array of spaced conductors;

a second array of spaced conductors intersecting said first array;

a first group of differential sense amplifiers responsive to adjacent spaced conductors in said first array for providing an output when currents induced in the connected adjacent conductors by the electromagnetic field provided by the probe are out of phase with each other to thereby provide positional information in at least one direction in the plane occupied by the conductors; and a second group of differential sense amplifiers responsive to adjacent spaced conductors in said second array for providing an output when currents induced in the connected adjacent conductors by the electromagnetic field provided by the probe are out of phase with each other to thereby provide positional information in at least another direction in the plane occupied by the conductors.

2. A device for detecting the position of a probe as set forth in claim 1 in which the conductors in the first and second arrays are uniformly spaced.

3. A device for detecting the position of a probe as set for in claim 1 in which the conductors in the first array are orthogonally arranged with respect to the conductors in the second array.

4. A device for detecting and signalling the position of an electromagnetic radiating source located in close proximity to a surface comprising:

a plurality of spaced substantially parallel horizontal and vertical conductors located in close proximity to the said surface;

a first group of differential sense amplifiers responsive to adjacent horizontal conductors for providing an output when the currents induced in the connected adjacent horizontal conductors by the radiating electromagnetic source are out of phase with each other to thereby provide positional information in one direction in the said plane; and a second group of differential sense amplifiers responsive to adjacent vertical conductors for providing an output when the currents induced in connected adjacent vertical conductors by the radiating electromagnetic source are out of phase with each other to thereby provide positional information in another direction within said plane.

5. A device for detecting and signalling the position of an electromagnetic source as set forth in claim 4 in which the horizontal and the vertical conductors are uniformly spaced from each other.

6. A device for detecting and signalling the position of an electromagnetic source as set forth in claim 5 in which the surface is planar.

7. A device for detecting the position of a probe radiating an electromagnetic field in close proximity to a surface comprising:

a first array of spaced conductors located in close proximity to said surface;

a second array of spaced conductors located in close proximity to said surface and arranged to intersect the conductors of said first array each once in at least two unique areas in alignment with said surface;

a first group of differential sense amplifiers responsive to adjacent spaced conductors in said first array for providing an output when currents induced in the connected adjacent conductors by the field radiated by the probe are out of phase with each other;

a second group of differential sense amplifiers responsive to adjacent spaced conductors in said second array for providing an output when currents induced in the connected adjacent conductors by the field radiated by the probe are out of phase with each other; and means responsive to the radiation from the probe for detecting the unique area within which the probe is located, said first and second amplifier outputs and the output from said last mentioned means providing information defining the probe location with respect to said surface.

References Cited

UNITED STATES PATENTS

| | | | |
|---|---|---|---|
| 2,204,628 | 6/1940 | Sorensen | 343—112 |
| 2,568,160 | 2/1952 | Handel | 178—18 |
| 3,106,707 | 10/1963 | Thompson | 343—7.3 |
| 3,342,935 | 9/1967 | Leifer et al. | 178—19 |

RICHARD A. FARLEY, Primary Examiner

RICHARD E. BERGER, Assistant Examiner.

U.S. Cl. X.R

718—19; 340—24